United States Patent [19]

Christenson

[11] Patent Number: 5,067,740
[45] Date of Patent: Nov. 26, 1991

[54] STRETCH TRAILER MIXER

[75] Inventor: Ronald E. Christenson, Kasson, Minn.

[73] Assignee: McNeilus Truck and Manufacturing, Inc., Dodge Center, Minn.

[21] Appl. No.: 629,050

[22] Filed: Dec. 14, 1990

Related U.S. Application Data

[63] Continuation of Ser. No. 441,253, Nov. 27, 1989, abandoned.

[51] Int. Cl.$^5$ .............................................. B60D 1/44
[52] U.S. Cl. ................................. 280/407; 280/149.2; 280/405.1
[58] Field of Search ...................... 280/401, 405.1, 407, 280/456.1, 149.2; 180/906

[56] References Cited

U.S. PATENT DOCUMENTS

| | | | |
|---|---|---|---|
| 2,835,504 | 5/1958 | Acker | 280/407 |
| 3,181,914 | 5/1965 | Humes | 280/149.2 |
| 3,198,548 | 8/1965 | Lund | 280/407 |
| 3,254,903 | 6/1966 | Rodney . | |
| 3,439,935 | 4/1969 | Guidice . | |
| 3,556,559 | 1/1971 | Interisano | 280/407 |
| 3,722,914 | 3/1973 | Walther | 280/407 |
| 4,195,856 | 4/1980 | Larson et al. | 280/704 |
| 4,340,309 | 7/1982 | Prichard | 280/404 |
| 4,492,507 | 1/1985 | Landoll et al. | 280/149.2 |
| 4,635,742 | 1/1987 | Bertolini | 280/149.2 |
| 4,641,846 | 2/1987 | Ehrhart | 280/149.2 |
| 4,865,341 | 9/1987 | Hicks | 280/149.2 |

FOREIGN PATENT DOCUMENTS

| | | | |
|---|---|---|---|
| 0666382 | 11/1865 | Belgium | 280/407 |
| 2521835 | 12/1975 | Fed. Rep. of Germany | 280/407 |
| 571325 | 1/1958 | Italy | 280/149.2 |

Primary Examiner—Kenneth R. Rice
Assistant Examiner—Mitchell Bompey
Attorney, Agent, or Firm—Haugen and Nikolai

[57] ABSTRACT

An improved trailer for a tractor-trailer combination is disclosed. The trailer has a first frame member which is designed to support a heavy load. Associated with the first frame member is a hitch pin assembly which can be slid along a portion of the first frame member and locked in pre-selected locations. The trailer also includes a rear slider assembly which carries the axles and wheels of the trailer. The rear slider assembly is also capable of being longitudinally slid between extended and retracted positions with respect to the first frame member. Locking means are also provided for locking the rear slider assembly to the first frame member at the desired location.

6 Claims, 7 Drawing Sheets

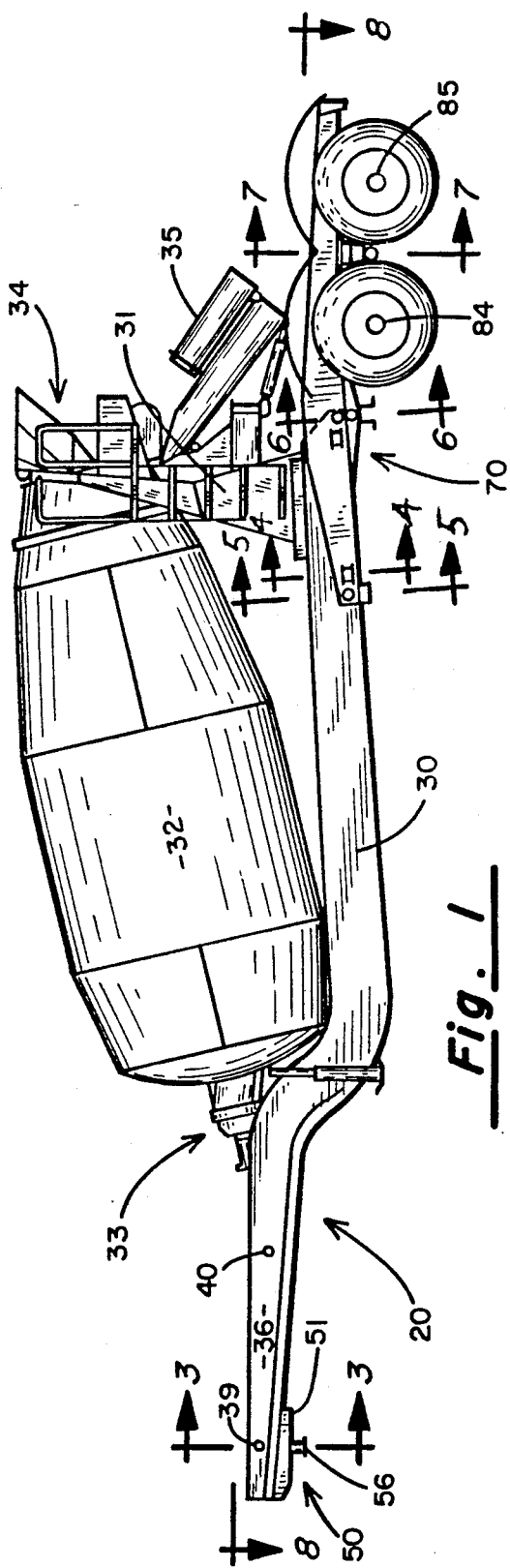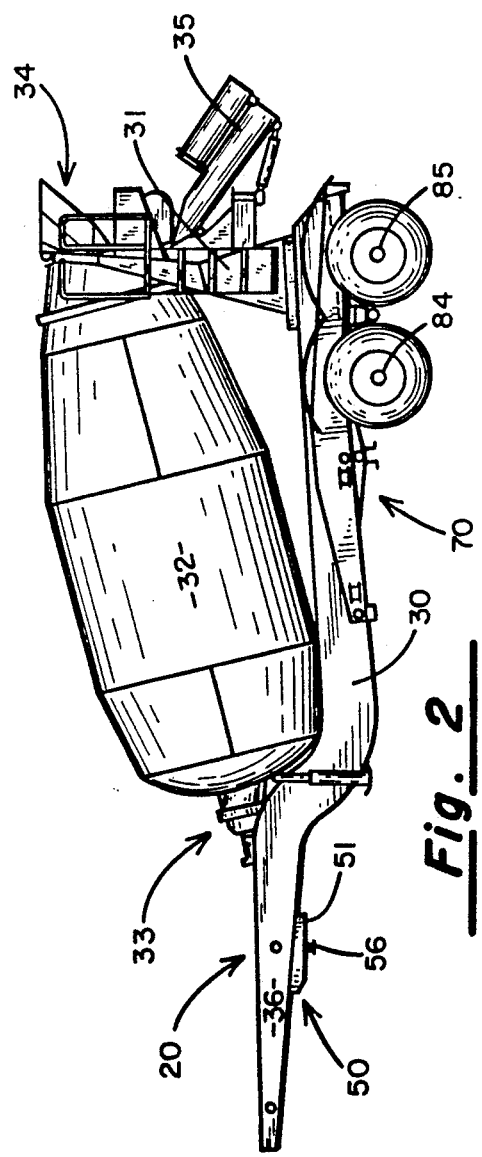

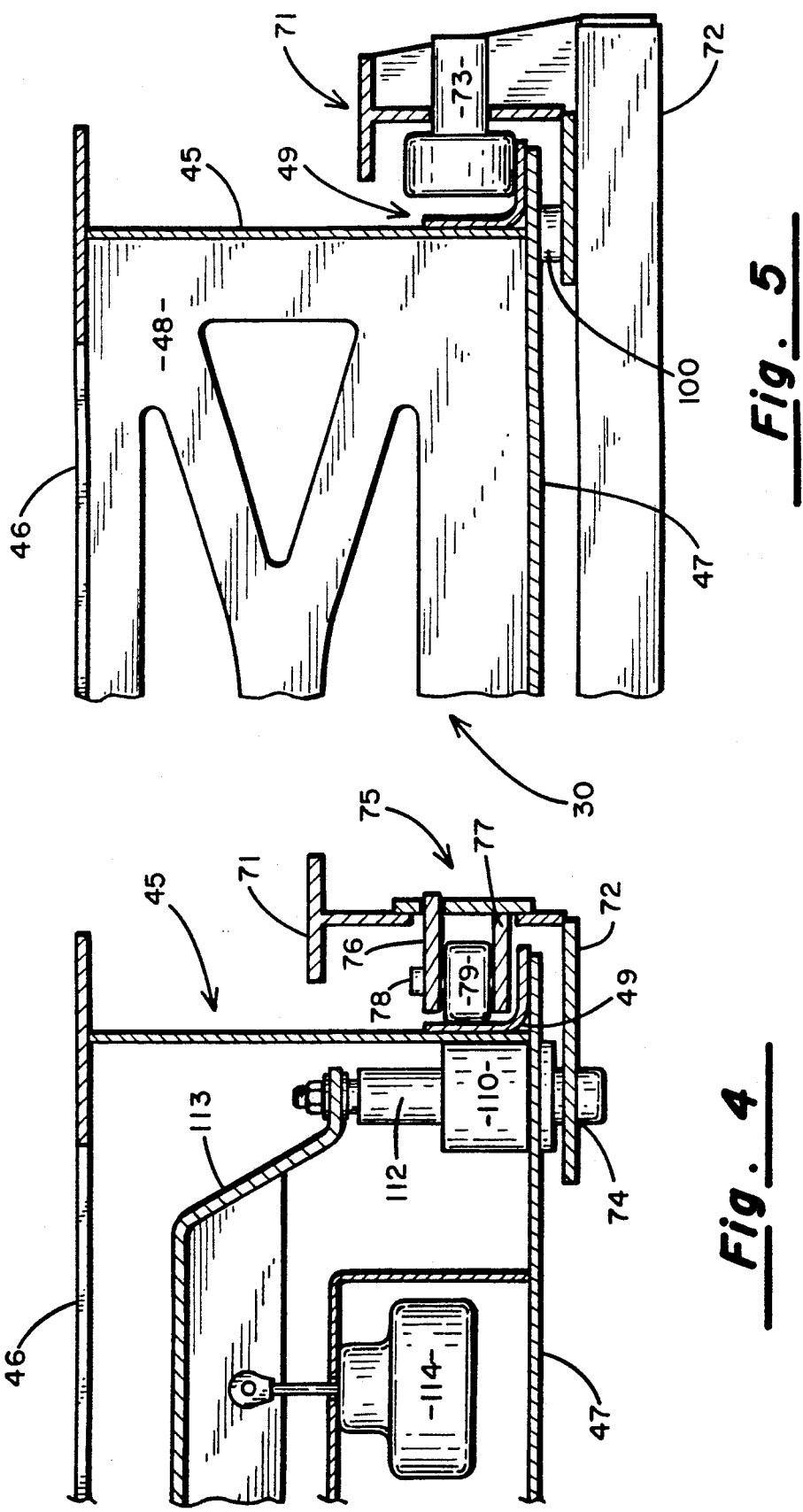

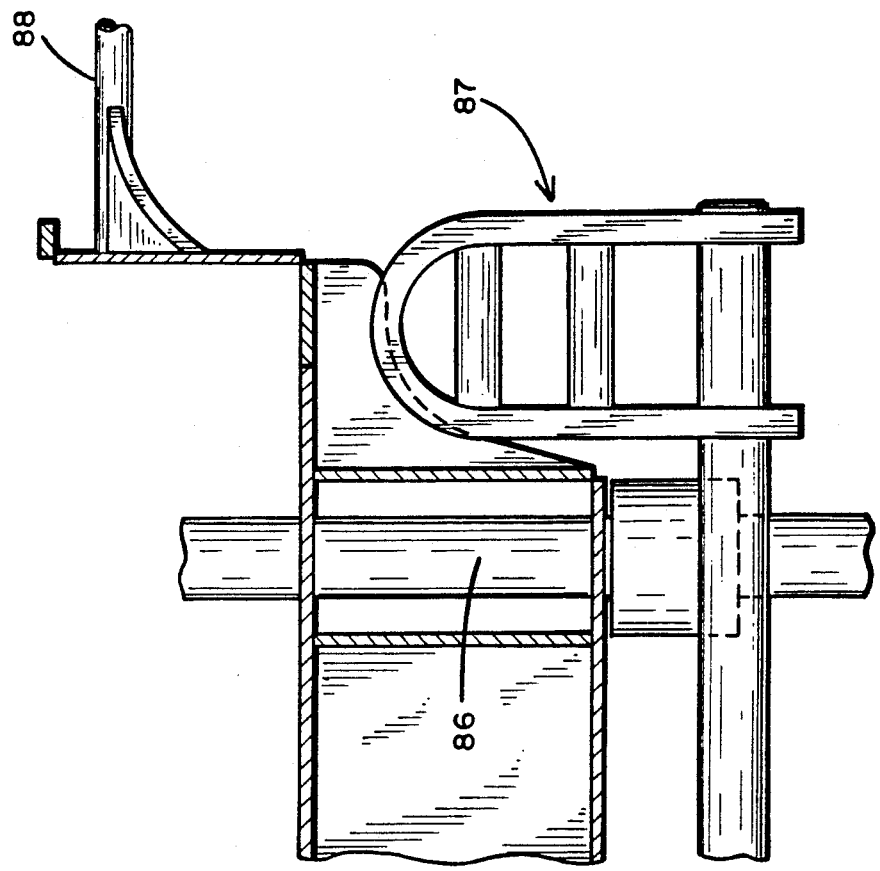
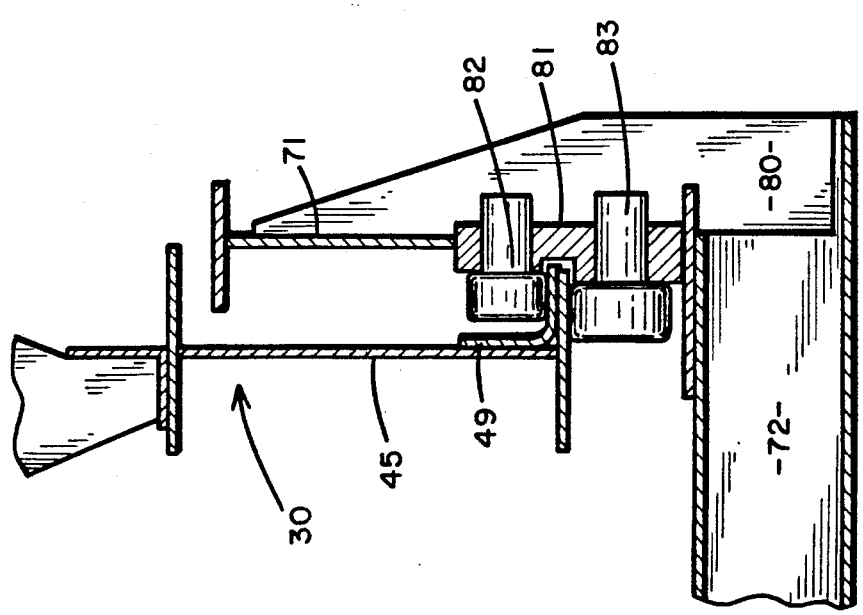

STRETCH TRAILER MIXER

This is a continuation of copending application Ser. No. 07/441,253, filed on Nov. 27, 1989 now abandoned.

BACKGROUND OF THE INVENTION

The present invention relates to transit concrete mixers More particularly, the present invention relates to a stretch trailer which carries a concrete mixing drum and related discharge equipment.

Transit concrete mixing trucks usually have a unitary frame which carries a cab and a rotatable drum behind the cab. The drum contains and mixes the concrete during transport. Such trucks further typically include steerable wheels beneath the cab and rear drive wheels in a dual axle arrangement. For additional support when the mixing drum is full, such trucks may also be equipped with one or more auxiliary wheel assemblies. Such auxiliary wheel assemblies can typically be pivoted between a ground engaging, load bearing position when the mixer is full and moving along public highways and an elevated, stowed position when the truck is empty or traveling off-road.

The typical arrangement described above, however, suffers from limited capability both from a maneuverability standpoint and because of governmental restrictions. For example, highway weight restriction laws allow a gross weight of 80,000 pounds on five axles provided that the front and rear axles are spaced by at least fifty feet, seven inches. At the same time, most states limit the length of trucks having a unitary frame to only forty feet. Thus, the only way to achieve the axle spacing need to carry the maximum load is the utilize a tractor-trailer arrangement.

Use of a typical tractor-trailer arrangement creates its own problems. For example, if a mixing drum is properly mounted on a standard trailer frame, to achieve proper balance, the discharge chute of the mixing drum should be mounted over the rear wheels in a position which tends to make access to the chute very awkward. More specifically, the wheels interfere with proper discharge of the concrete from the drum. If the drum is mounted on a typical trailer frame in a position to avoid this problem, proper balance is lost.

It is therefore an object of the present invention to provide a transit concrete mixer which is capable of legally achieving a 50'-7" span and a gross weight of 80,000 pounds.

Another object of the present invention is to provide such a concrete transit mixer so that the wheels and frame do not interfere with discharge of the concrete.

Still another object of the invention is to provide such a mixer which has a low center of gravity when the unit is loaded and traveling down the road.

A further object of the present invention is to provide such a concrete transit mixer which has a high ground clearance when the vehicle is driven off-road.

Another object of the invention is to provide a transit mixer which has an elevated rear end to allow the discharge mechanism to be at a greater height.

Still another object of the invention is to provide a transit mixer with means for reducing the length of the trailer frame when necessary for maneuverability or to place added weight on the drive wheels of the tractor for greater traction.

SUMMARY OF THE INVENTION

To achieve these and other objects, there is provided a transit concrete mixer having a tractor-trailer configuration. The trailer includes a front hitch point which is movable with respect to the frame of the trailer. The trailer also includes a rear slider assembly which carries the rear wheels and permits them to be moved relative to the main frame of the trailer at inclined angles.

When the hitch point and slider assembly are in their fully extended position, the required 50'-7" length is achieved and the trailer frame and mixing drum will be at a low height, yielding a low center of gravity and greater stability. Conversely, when the hitch point and the slider assembly are retracted, the frame and mixing drum are raised to a greater height, yielding better ground clearance and a shorter length for better maneuverability over rough, uneven terrain. Such terrain is typically encountered when the unit is driven off the road at a job site. Traction is also improved when the hitch point and slider assembly are in the retracted position because more of the weight is over the drive wheels of the tractor.

An important advantage derived from the rear slider assembly becomes apparent when material is to be discharged from the mixing drum. The rear slider assembly can be pulled completely forward of the working area allowing easy access. At the same time the discharge mechanism is elevated to a greater height permitting more effective discharge of concrete.

It is important to note that the present invention permits the hitch point and the rear slider assembly to be extended or retracted independently of each other. Usually, however, both would be extended during highway transport of a full load and both would be retracted during off-road transport or when the mixing drum is empty for greater maneuverability.

Retraction and extension of the rear slider assembly and hitch point are made relatively easy, given the design of the present invention. The brakes of the axle associated with the rear slider assembly are set. Next, the hitch latch pins and/or the rear slider latch pins are unlocked. Then the tractor is driven forward or rearward depending on whether it is desired to extend or reduce the overall vehicle length. No separate power device is needed to extend or retract the length.

The latch pins are independently operated using air actuators from inside the cab. The rear slider assembly has rugged rollers which run on the lower part of the main frame. This promotes low friction during the extension and retraction process. A pair of guide rollers on each side prevent jamming during this process. Thus, the design is simple and easy to maintain without complicated hydraulic or electric devices.

DESCRIPTION OF THE DRAWINGS

FIG. 1 is a side view of the trailer section of the transit mixer of the present invention with the hitch point and rear slider assembly each in its extended position FIG. 2 is a side view of the trailer section of the present invention with the hitch point and the rear slider assembly each in its retracted positions.

FIG. 4 is a cross-sectional view taken along line 4—4 of FIG. 1.

FIG. 5 is a cross-sectional view taken along line 5—5 of FIG. 1.

FIG. 6 is a cross-sectional view taken along line 6—6 of FIG. 1.

FIG. 7 is a cross-sectional view taken along line 7—7 of FIG. 1.

DETAILED DESCRIPTION OF THE PREFERRED EMBODIMENT

Figure 3:
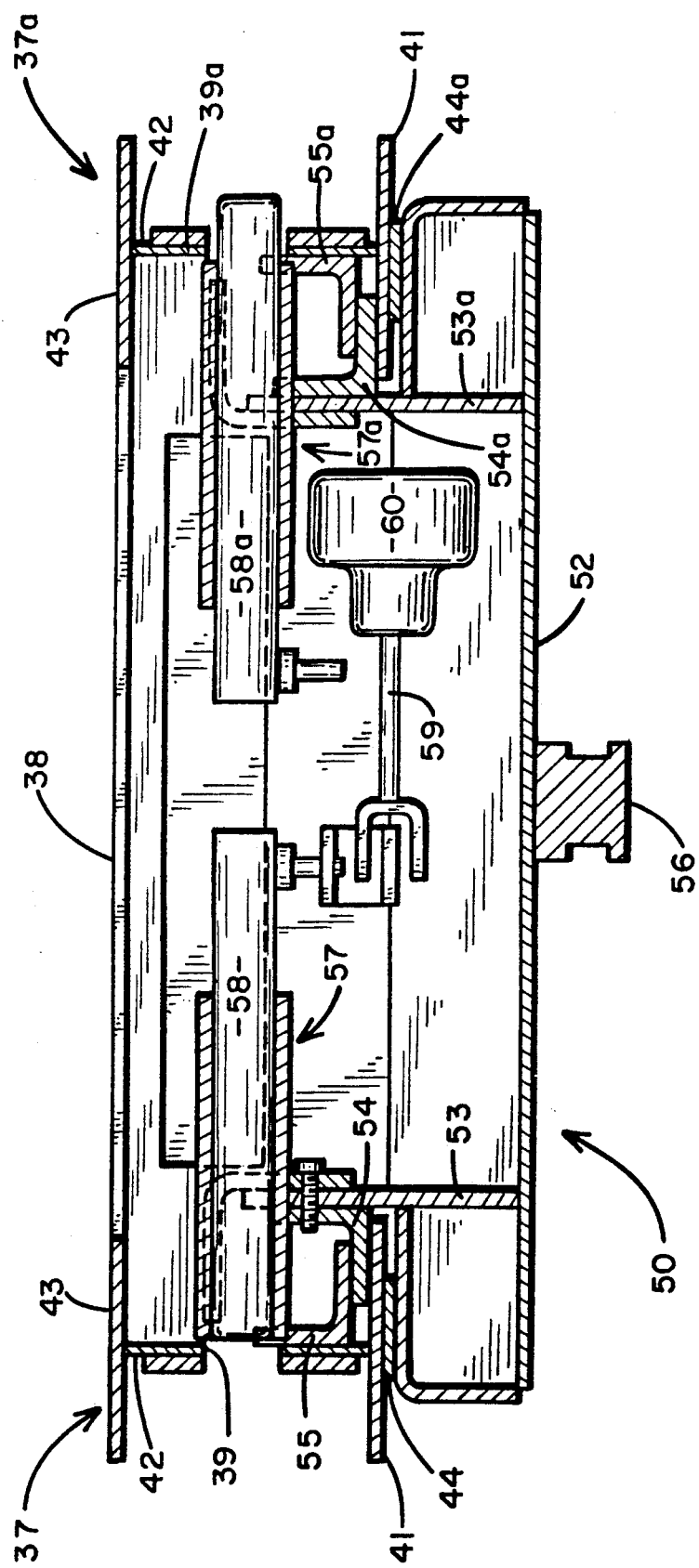
FIG. 3 is a cross-sectional view taken along line 3—3 of FIG. 1.

The present invention contemplates a tractor (not shown) attached to a trailer 20. The tractor is of a standard design having a cab, an engine, steerable wheels, drive wheels and a hitch. The trailer 20 includes a frame 30, a movable king pin assemble 50 intended to mate with the tractor's hitch and a rear slider frame assembly 70.

Supported above the frame 30 by a rear pedestal 31 is a mixing drum 32. The mixing drum 32 is capable of being rotated by a standard drum drive 33. At the rear of the drum 32 is a discharge mechanism 34 and a discharge chute 35.

The frame 30 specifically includes a tongue section 36 to which the king pin assembly 50 is secured. As shown best in FIGS. 1, 2,3, 8 and 9, the tongue 36 includes a pair of side rails 37 and 37a and a cross bracing 38. The rails 37 and 37a have an I shaped cross section comprised of a base 41, a center member 42 and a top 43. Rails 37 and 37a also have aligned front lock holes 39 and 39a and rear lock holes 40 and 40a. Each of these lock holes pass through the center member 42 of the associated rail 37 or 37a.

The king pin assembly 50 includes a housing 51. Housing 51 comprises a base 52, a pair of upright supports 53 and 53a, a first retaining member 54 and 54a secured to and projecting outwardly from the associated upright support 53 or 53a and a second retaining member 55 and 55a secured to and projecting inwardly from the associated rails 37 and 37a. When assembled, a gap exists between the first retaining members 54 and 54a and the base 41 of the I shaped rails 37 and 37a. Second retaining members 55 and 55a are slidably received within the gaps. This configuration allows the tongue 36 to retain the king pin assembly 50 in a slidable fashion.

The king pin assembly 50 also includes a king pin 56, two latch pin guide tubes 57 and 57a and a pair of latch pins 58 and 58a. Latch pins 58 and 58a mate with the lock holes 39 and 39a or the lock holes 40 and 40a to retain the king pin in the proper position. Of course, rollers, bearing strips 44 and 44a or the like can be added to reduce friction as the king pin assembly is moved between its extended position shown in FIG. 1 and its retracted position shown in FIG. 2.

In one embodiment, the latch pins 58 and 58a are connected via a linkage 59 to pneumatic actuators 60 which are operable from the cab. When the actuators 60 are pressurized, the latch pins 58 and 58a are retracted from their mating relationship with the lock holes (39 and 39a or 40 and 40a) as shown in FIG. 3. The king pin assembly 50 can then be slid forward or rearward with respect to the frame until stops 100 and 100a or 101 and 101a on the tongue section 36 of the frame 30 are engaged. Depressurization of the pneumatic actuator will then serve to cause the pins to mate with the appropriate set of lock holes (39 and 39a or 40 and 40a) locking the king pin in place.

Figure 9A:
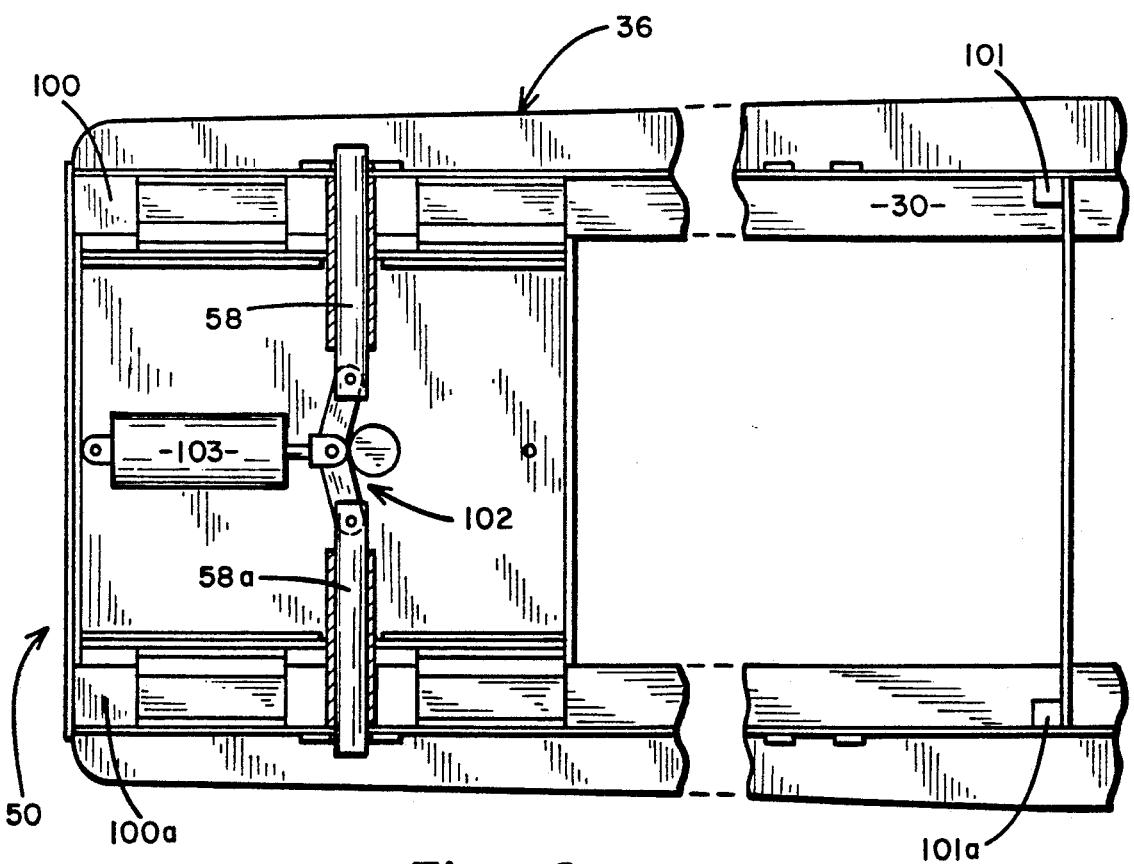
FIG. 9a shows an alternative embodiment of the structure set forth in FIG. 9.

FIG. 9a shows an alternative embodiment of the king pin assembly 50. In this alternative embodiment, the latch pins 58 and 58a are connected via a linkage 102 to a pneumatic actuator 103 which is operable from the cab. The design of the linkage 102 is such that when the arm of the actuator 103 is extended, the locking pins will be retracted from their mating position with the lock holes so that the king pin assembly can be slid forward or rearward with respect to the frame until the stops 100 and 100a or 101 and 101a on the tongue section 36 of the frame 30 are engaged. Depressurization of the pneumatic actuator will serve to cause the pins to mate with the appropriate set of lock holes locking the king in assembly in place. The alternative design of FIG. 9a has certain advantages over the design of FIG. 9.

Figure 9:
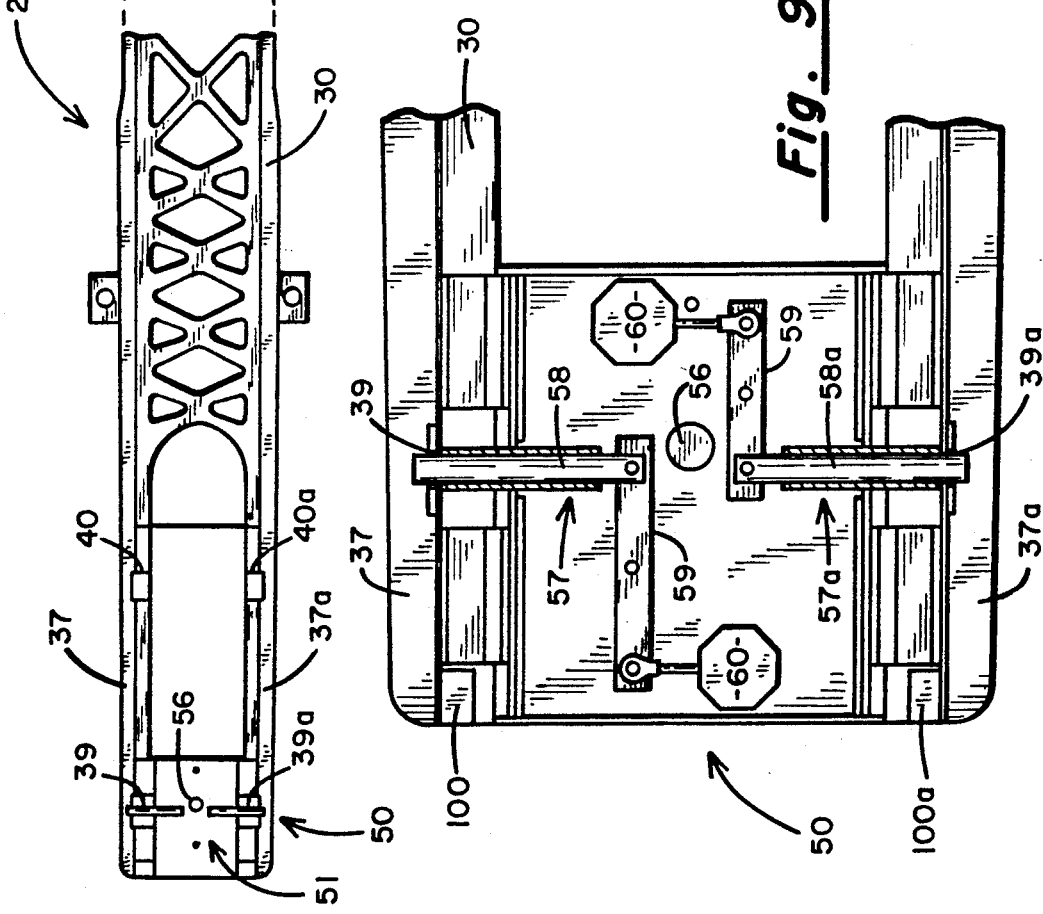
FIG. 9 is a more detailed view of the portion of FIG. 8 showing one embodiment of the king pin assembly.

In the design of FIG. 9 the locking pin could be forced out of the locked position if a force greater than the actuator force acted on the locking pins. With twisting and vibratory motions, this might possibly happen so the alternative design of FIG. 9a, having an over-center locking action, was developed. This alternative design uses two latch linkage bars which have their pivot points nearly in line when the locking pins are in their locked position. Thus, if a force on the latch pins were exerted, the force could not move the actuator in a direction to cause the latch pins to release from the trailer frame lock holes. In fact, any inward force in the latch pins would tend to hold the actuator in the locked position thus assuring that the locking pins stayed locked even when outside forces may be exerted on the locking pins.

FIGS. 1-2, 4-8 and 10 show the construction of the rear slider frame assembly 70 and the manner in which it is slidably connected to the frame 30 of the trailer.

As best seen in FIG. 5, the rear section of the trailer frame includes a pair of I-shaped side rails 45 which are retained in proper alignment by top plate 46, bottom plate 47 and support web 48. Secured to the lower outside portion of side rail 45 is a doubler rail 49. An identical doubler rail 49a is secured to side rail.

FIGS. 4 and 5 also show that the rear slider frame assembly 70 includes a pair of I-shaped side rails 71 which are located outside of the side rails 45 and 45a of the trailer frame. FIG. 5 also shows that the rear slider frame assembly 70 includes a cross member 72 which runs beneath the trailer frame 30. A guide stop 90 prevents excessive motion between the double rail 49 and the front guide roller 73. The front guide rollers 73 help reduce friction between the trailer frame 30 and the rear slider frame assembly 70 when the rear slider frame is moved from its extended position shown in FIG. 1 to its retracted position shown in FIG. 2.

FIG. 4 shows one means by which the rear slider frame assembly 70 is locked into position with respect to the trailer frame 30. Specifically, there is secured to the trailer frame a pair of lock pin housings 110 which slidably receive respective lock pins 112. One end of each lock pin 112 is connected to a linkage 113 which leads to a pneumatic actuator 114. The lock pins 112 are intended to mate with an associated bore 74 through the cross member 72 of the rear slider frame assembly 70. FIG. 4 shows the lock pins 112 in the locked position, which precludes movement of the rear slider frame assembly 70 with respect to the frame 30. It should be noted that the lock pins 112 will remain in this position until the pneumatic actuator 114 is pressurized (using controls in the vehicle's cab). Pressurization of the actuator 114 will cause the linkage 113 to lift the lock pin 112 out of the bore 74 through the cross member 72 of the rear slider frame assembly 70 and allow relative movement of the rear slider frames assembly 70 and the frame 30.

FIG. 4 also shows the side guide roller assemblies 75 which maintain proper alignment between the rear slider frame assembly 70 and the frame 30. The side guide roller assemblies 75 each include a top bracket 76, a bottom bracket 77, an axle 78 and a roller 79. The guide roller assemblies 75 are designed so that the roller 79 is in constant contact with the doubler rail 49 of the trailer frame 30.

Figure 4A:
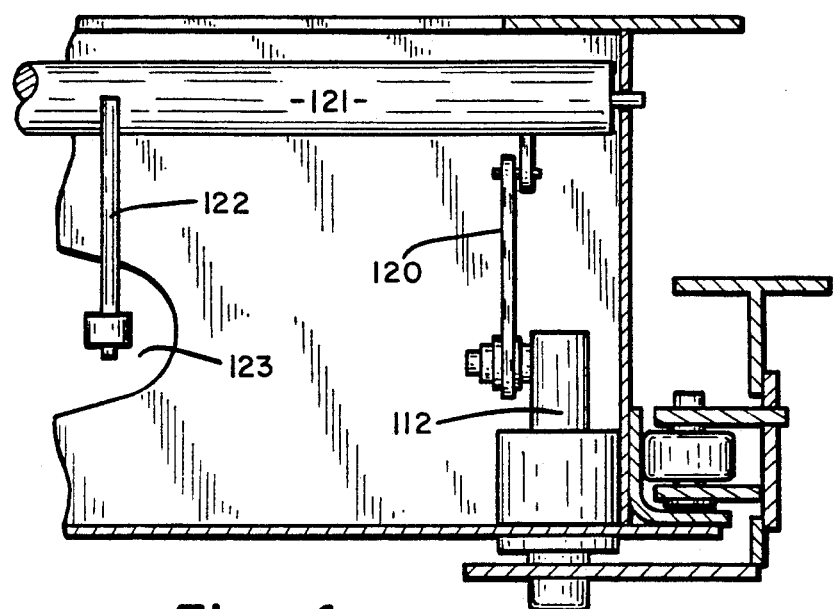
FIG. 4a shows an alternative embodiment of the structure set forth in FIG. 4.

For ensuring that the mechanism used to latch the rear slider assembly to the frame remains locked, and the alternative design shown in FIG. 4a can be used. This design includes a latch linkage bar 120 secured at one end to the rear locking pin 112, a latch linkage torque tube 121 secured to the opposite end of the latch linkage bar 120, a latch linkage actuator arm 122 and the rear latch air cylinder 123. When the rear locking pins 112 are in the lock position, the latch linkage bar 120 is slightly beyond the bottom center position. This design prevents the locking pins 112 from inadvertently being forced into the unlocked position. As a result, the locking pins 112 can only be moved into the unlocked position by actuation of the air cylinder 123 via a control located in the cab.

It is important to note in the modified design shown in FIGS. 4a and 9a double acting air cylinders are used for both the king pin lock assembly and the rear slider lock assembly. This results in a net reduction in components requiring maintenance and repair.

FIG. 6 is a cross section of the trailer along line 6—6 in FIG. 5. Again, each side of the trailer frame 30 includes an I shaped side rail 45 (not shown) and an L-shaped doubler rail 49. The rear slider frame assembly 70 includes a pair of I-shaped rails 71, a cross member 72, and a gusset 80 running between the I-shaped rails 71 and the cross member 72. The rear slider frame assembly 70 also includes a pair of guide roller mounting blocks 81, a pair of top guide rollers 82 which ride along the top of the doubler rails 49 and a pair of bottom guide rollers 83 which ride along the lower flange of the I-shaped side rails 45 and 45a of the trailer frame 30. The top guide rollers 82 and bottom guide rollers 83 are present to maintain proper alignment between the trailer frame 30 and the rear slider frame assembly 70.

Figure 10:
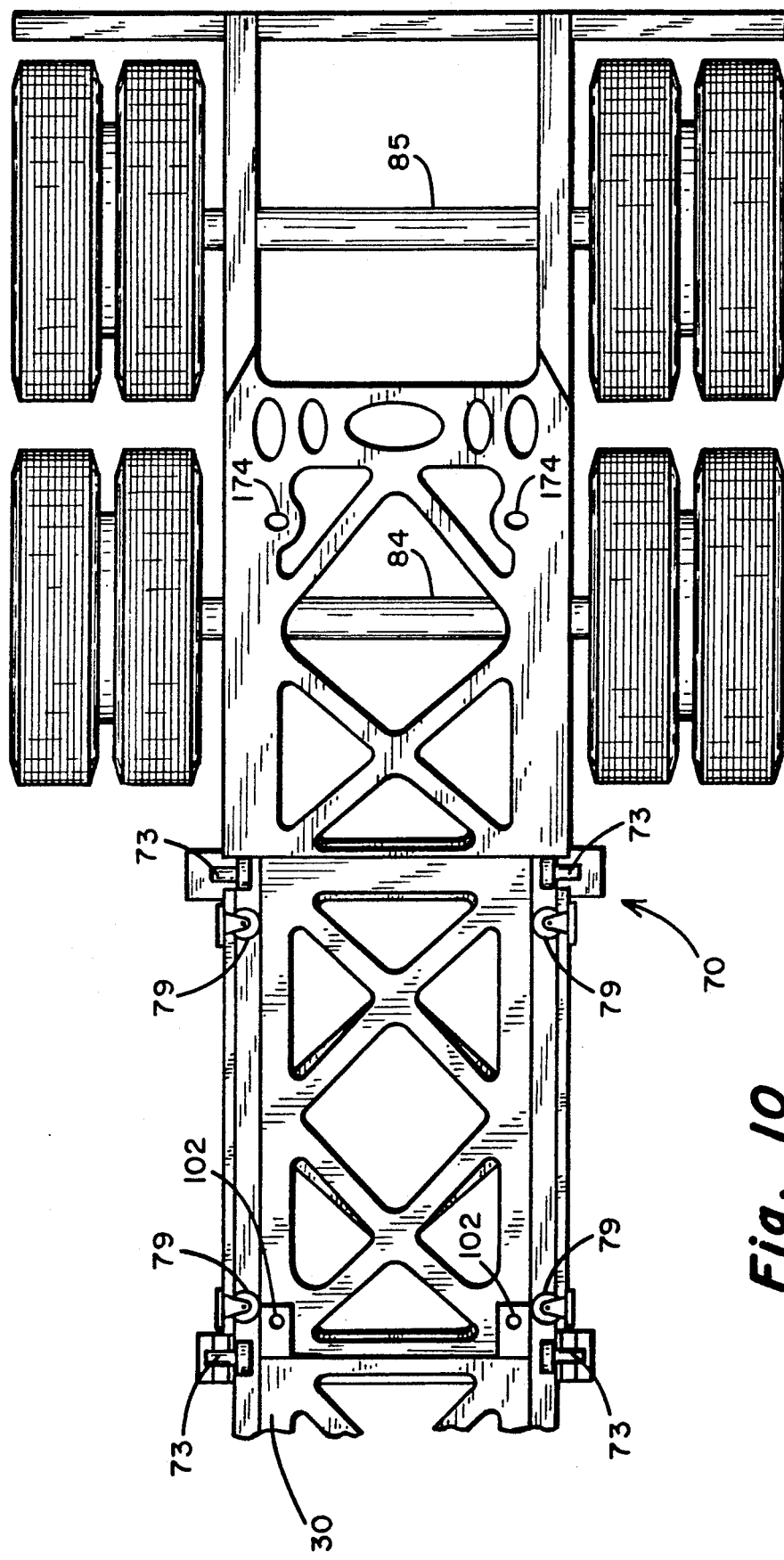
FIG. 10 is a more detailed view of the portion of FIG. 8 showing the slider frame.

FIGS. 7 and 10 show best the manner in which the two rear axles 84 and 85 are mounted to the slider frame assembly 70. The slider frame assembly includes a pair of suspension mounts 86, and a pair of suspension members 87. One set carries axle 84 while the other set carries axle 85. FIG. 7 also shows feeder mount pipe 88 mounted to the slider frame.

In summary, then, the present invention contemplates a frame 30, a king pin assembly 50, and means for securing said king pin assembly 50 to said frame 30 so that the king pin assembly can be slid longitudinally with respect to the frame between a first pre-selected position shown in FIG. 1 and a second pre-selected roading position shown in FIG. 2. The invention also contemplates means for releasably locking the king pin assembly 50 to the frame 30 in either said first or said second pre-selected roading positions. The contemplated locking means are best shown in FIGS. 3 and 9.

Another very important aspect of the present invention is the presence of a rear slider assembly 70. As shown, the rear slider assembly 70 includes a pair of axles 84 and 85 which each carry a set of four wheels to help support the trailer. Means for securing the rear slider assembly 70 to the first frame member 30 are shown in FIGS. 4-8 and 10. Those skilled in the art will recognize that the contemplated securement means permit the rear slider assembly to be slid longitudinally with respect to the frame between the pre-selected position shown in FIGS. 1 and 8 and the pre-selected position shown in FIG. 2. The means for releasably locking the rear slider assembly to the frame in either of these pre-selected positions is shown most effectively in FIG. 4.

OPERATION

Figure 8:
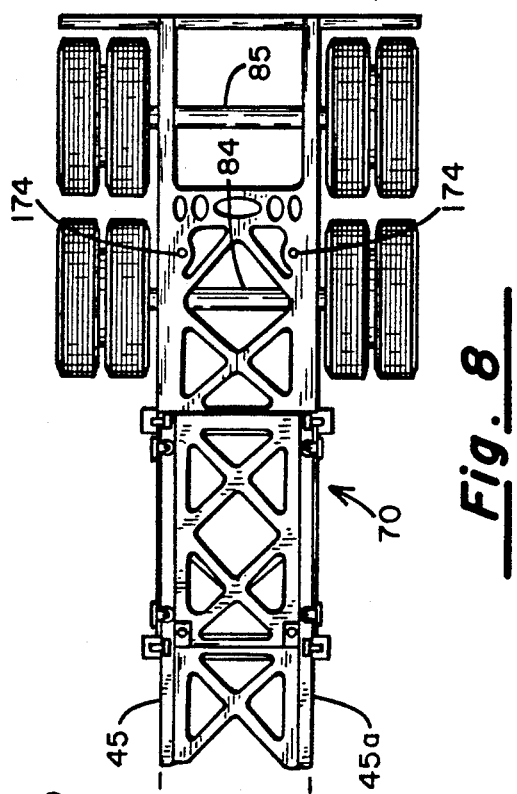
FIG. 8 is a cross-sectional view taken along line 8—8 of FIG. 1.

Operation of the preferred embodiment will now be discussed in greater detail. FIGS. 1 and 8 shows the king pin assembly 50 and the rear slider frame assembly 70 in their fully extended positions. To reconfigure the trailer frame so that the king pin assembly 50 and the rear slider assembly 70 are in their retracted positions as in FIG. 2, it is first necessary to set the pneumatic brakes (not shown) on the rear wheels. Next, the pneumatic actuators 60 and 104 associated with lock pins 58, 58a and 102, respectively, are pressurized to cause the associated linkage to withdraw the lock pins 58, 58a and 112 from their associated look holes 39, 39a and 174. Once this has been accomplished, the operator of the vehicle can place the tractor in reverse, and using the power of the tractor engine, cause the slidable rear frame member 70 and the sliding king pin assembly 50 to retract until the stops are engaged. Once the stops are engaged by the various frame elements, the pneumatic actuators 60 and 104 are depressurized causing the locking pins to mate with rear lock holes 40, 40a, and 174.

As those skilled in the art will readily recognize, the design of the present invention permits the frame members to slide quite easily and without the chance of buckling or damaging the various frame elements when the lock pins are retracted from the locking holes. Yet, when the lock pins are extended into the locking holes, the frame members are rigidly held in place and cannot slide.

As best represented by FIGS. 1 and 2, it is clear that when the king pin assembly 50 and the rear slider assembly 70 are in their retracted positions, the first roading position the entire base of the frame 30 will be a greater distance from the ground than when these elements are in their extended position. Similarly, when these elements are in their extended position, the second roading position the center of gravity of the trailer vehicle will be closer to the ground. This is a direct result of the shape of the various frame elements and the way that these elements interact with the associated components.

Those skilled in the art will recognize that modifications and changes to the described design could be made without deviating from the invention. Therefore, the appended claims, when read in light of their full range of equivalents, are intended to define the scope of the present invention.

What is claimed is:

1. A trailer for a tractor trailer combination comprising:
   (a) a first frame member;
   (b) a hitch pin assembly;
   (c) means for securing said hitch pin assembly to said first frame member so that said hitch pin assembly can be slid longitudinally with respect to said first frame between first and second pre-selected positions;
   (d) means for releasably locking said hitch pin assembly to said first frame member in either said first or said second pre-selected position;
   (e) a rear slider assembly having at least one axle and an associated pair of wheels which help support the trailer;
   (f) means for securing said rear slider assembly to said first frame member so that said rear slider assembly can be slid longitudinally with respect to said first frame member between a retracted roading position in which the first frame member has a first height, yielding a higher center of gravity and greater ground clearance over the entire length of the trailer bed, and an extended second roading position in which the first frame member has a second height, yielding a lower center of gravity and less ground clearance than in first roading position; and
   (g) means for releasably locking said rear slider assembly to said first frame means in either said third or fourth pre-selected position.

2. The trailer of claim 1 wherein said means for releasably locking said hitch pin assembly to said first frame member includes a locking pin secured via a linkage to a fluid actuator which, when pressurized, releases said hitch pin assembly from said first frame member so that the hitch pin assembly can be longitudinally slid with respect to the first frame member and, when not pressurized, locks said hitch pin assembly to the first frame member to prevent said hitch pin assembly and said first frame member from longitudinally sliding with respect to each other.

3. The trailer of claim 1 wherein said means for releasably locking said rear slider assembly to said first frame member includes a locking pin secured via a linkage to a pneumatic actuator which, when pressurized, releases said rear slider assembly from said first frame member so that the rear slider assembly can be longitudinally slide with respect to the first frame member and, when not pressurized, locks the rear slider assembly to the first frame member to prevent them from longitudinally sliding with respect to each other.

4. The apparatus of claim 2 wherein said linkage precludes inadvertent unlocking of the hitch assembly from the first frame member.

5. The apparatus of claim 3 wherein said linkage precludes inadvertent unlocking of the rear slider assembly from the first frame member.

6. A trailer for a tractor trailer combination comprising:
   (a) a first frame member having front and rear sections;
   (b) a hitch pin assembly secured to said front section of the first frame member so that said hitch pin assembly can be slide longitudinally with respect to said first frame member between first and second preselected positions;
   (c) means for releasably locking said hitch pin assembly to said first frame member either in said first or second preselected positions;
   (d) a rear slider assembly having at least one axle in an associated pair of wheels which help support the trailer;
   (e) means for securing the rear slider assembly to said rear section of the first frame means so that the rear slider assembly can be slid longitudinally with respect to the first frame member between a retracted roading position in which the first frame member has a first height, yielding a higher center of gravity and a greater ground clearance over the entire length of the trailer bed, and an extended second roading position in which the first frame member has a second height, yielding a lower center of gravity and less ground clearance than in first roading position, said means including a first pair of side rails which are a part of the rear section of the first frame member, a second pair of side rails which are a part of the side rear slider assembly and are located outside of the first side rails and are interlocking therewith, and means for guiding said rear slider assembly and reducing friction between said rear slider assembly and said first frame member as the rear slider assembly is slid between the retracted third position and the extended fourth position; and
   (f) means for releasibly locking said rear slider assembly to said first frame means and either said third preselected position or said fourth preselected position.

* * * * *